(12) United States Patent
Yun et al.

(10) Patent No.: US 10,605,890 B1
(45) Date of Patent: Mar. 31, 2020

(54) LOCALIZATION OF EXTERNAL INTERFERENCE IN WIRELESS NETWORKS

(71) Applicant: Spectrum Effect Inc., Kirkland, WA (US)

(72) Inventors: Jungnam Yun, Kirkland, WA (US); Eamonn Gormley, Kirkland, WA (US)

(73) Assignee: SPECTRUM EFFECT INC., Kirkland, WA (US)

( * ) Notice: Subject to any disclaimer, the term of this patent is extended or adjusted under 35 U.S.C. 154(b) by 0 days.

(21) Appl. No.: 16/211,181

(22) Filed: Dec. 5, 2018

(51) Int. Cl.
| | | |
|---|---|---|
| *H04W 16/30* | (2009.01) |
| *G01S 5/02* | (2010.01) |
| *H04B 17/391* | (2015.01) |
| *G01S 5/04* | (2006.01) |
| *H04W 16/14* | (2009.01) |
| *H04B 17/345* | (2015.01) |

(52) U.S. Cl.
CPC ............ *G01S 5/0252* (2013.01); *G01S 5/04* (2013.01); *H04B 17/345* (2015.01); *H04B 17/3911* (2015.01); *H04W 16/14* (2013.01); *H04W 16/30* (2013.01)

(58) Field of Classification Search
CPC ........ H04W 24/10; H04W 4/02; H04W 88/08
USPC ................... 455/422.1, 446, 450, 456.1
See application file for complete search history.

(56) References Cited

U.S. PATENT DOCUMENTS

| | | | | |
|---|---|---|---|---|
| 2003/0040318 A1* | 2/2003 | Fattouch | ............... | H04W 16/18 455/446 |
| 2010/0178925 A1* | 7/2010 | Bernini | ................. | H04W 16/18 455/446 |

* cited by examiner

*Primary Examiner* — Sam Bhattacharya

(57) ABSTRACT

A method for localizing interference uses data available to wireless communication networks to determine probabilities of a source of external interference being located at a plurality of predetermined locations.

20 Claims, 12 Drawing Sheets

LOCALIZATION OF EXTERNAL INTERFERENCE IN WIRELESS NETWORKS

BACKGROUND

The wide adoption of mobile devices along with ubiquitous cellular data coverage has resulted in an explosive growth of mobile applications that expect always-accessible wireless networking. This growth has placed demands on network performance including demands for fast and reliable communication paths, which causes increasing strain on the limited radio-frequency (RF) spectrum allocated to wireless telecommunication. Accordingly, efficient use of the limited spectrum is increasingly important to the advancement of wireless communication technology.

Interference is a barrier to efficient use of wireless spectrum. Modern wireless communications operate in interference limited environments where signal quality to and from network subscriber devices is limited in part by interference from other users served by the same or nearby cells. The design and optimization of these networks are based on having clear spectrum occupied only by radio frequency transmitting equipment associated with the specific network. However, this ideal of clear spectrum occupied only by intended users of the system is not always achieved.

Real world systems often experience unexpected network interference which may originate from radio frequency (RF) generating sources that are not otherwise associated with a licensed wireless network. These potential interference sources include many things such as industrial machinery, electronics test equipment radiating signals in the bands of interest, undesired mixing products generated by the licensed system itself and illegal radio sources. The result of these system interference sources is degraded system service and reduced wireless network capacity and coverage as the intentional signals suffer capacity and quality losses due to these interferers.

After determining that external interference is present, geo-location techniques can be used to characterize and locate a source of the interference. Another common application for geo-location techniques is to locate a 911 caller.

Various geo-location techniques, such as, Time-of-Arrival (TOA) and Time-Difference-of-Arrival (TDOA) techniques, Power-of-Arrival (POA) and Power-Difference-of-Arrival (PDOA) techniques, Frequency-Difference-of-Arrival (FDOA) techniques, and Angle-of-Arrival (AoA) geolocation techniques have been widely used to detect and locate radio signal emitters. However, measured time or frequency-based techniques require a precise timing source such as a common clock or a common frequency reference, which is not typically present for external interference sources.

POA or PDOA can be used to detect and locate an external interference source by collecting power measurement data from three or more receivers with known locations. However, the accuracy of conventional measured power-based techniques is highly limited by fading and shadowing in the radio environment, and may require additional measurement systems to collect the measured power data in order to make an accurate location determination.

TECHNICAL FIELD

Embodiments of the present disclosure relate to a system and method that detects and localizes external interference sources in a wireless communication network using network management data.

BRIEF SUMMARY

This disclosure describes a system and method that use network management data to localize external interference. The network management data may include Configuration Management (CM) data, Performance Management (PM) data and topology data. Localization is accomplished by generating a probability heatmap of possible locations of external interference around the affected area. Embodiments can determine location with a high degree of accuracy in a complex radio environment.

In an embodiment, a method for locating a source of interference external to a wireless telecommunications network includes receiving signal strength measurement data from a plurality of cellular antennas of multi-sector cell sites, determining that an external interference signal is present in the measurement data, establishing a grid of pixels that represents an area associated with the plurality of cellular antennas, determining respective first signal strength values for the pixels in the grid, and determining respective probability values for the pixels in the grid by comparing the signal strength measurement data to the first signal strength values.

In an embodiment, determining the first signal strength values includes determining an angle of arrival for a pair of antennas of a cell site for each of the pixels and determining an expected interference power for each of the pixels using the associated angles of arrival. Determining the respective probability values may include determining differences between the measured values for antennas in an antenna pair and a hypothetical interference value for each pixel, and assigning respective probability values to each pixel based on the differences.

In an embodiment, when a measured value of a first antenna of the antenna pair is equal to the noise floor and a measured value of a second antenna of the antenna pair is above the noise floor, the first signal strength value of the second antenna is set based on a difference between the measured value of the second antenna and the noise floor.

In an embodiment, assigning the probability values includes segmenting a normal distribution into a set of binned values and assigning one the binned values as the probability value for each pixel for a respective antenna pair. The probability values may be assigned by combining the binned values of antenna pairs of each cell site and combining probability values of each cell site, wherein the respective probability values for the pixels are the combined probability values of each cell site.

In an embodiment, the grid comprises a plurality of shapes that represent the pixels, and the grid is associated with a geographic area that includes all of the multi-sector cell sites.

Determining the respective probability values for pixels may include determining at least two local probability maxima within the grid, each of the local probability maxima being associated with a respective source of the external interference. An embodiment may include providing a heat map indicating probability values of at least a portion of the pixels in the grid.

Comparing the signal strength measurement data to the first signal strength values may include determining differences between the signal strength measurement data and the first signal strength values to determine the respective probability values.

Embodiments of the present application include a wireless telecommunications system comprising a spectrum analysis server configured to locate a source of interference external to a wireless telecommunications network, the spectrum analysis server comprising a processor and a non-transitory computer readable medium with instructions stored thereon which, when executed by the processor, perform one or more of the steps provided above.

DETAILED DESCRIPTION

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the sake of clarity, technical material that is known in the technical fields related to this disclosure has not been described in detail so that the disclosure is not unnecessarily obscured.

Figure 1:
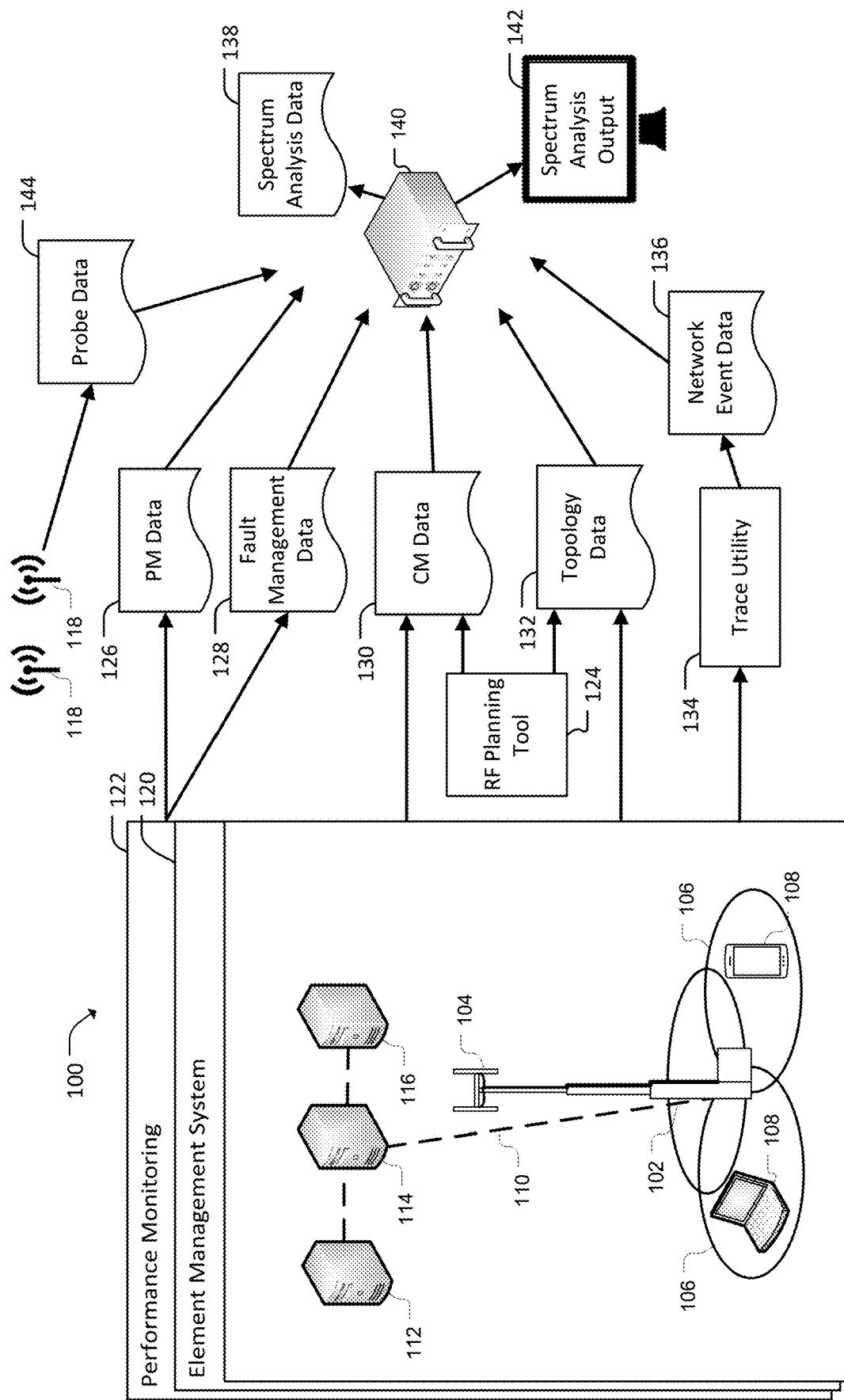
FIG. 1 illustrates a system for identifying interference in a cellular communications network according to an embodiment.

FIG. 1 illustrates a networked spectrum analysis system 100 according to an embodiment. The system 100 integrates information from available wireless network sources to detect, isolate, characterize and locate undesired radio frequency interference in the context of a wireless network. Sources of this information, which are hardware elements of a wireless network, are available in typical wireless cellular networks, but they are not conventionally connected and configured in the manner suggested by this disclosure. In particular, the spectrum analytics server 140 is a novel component of a telecommunications network.

A radio access portion of system 100 may include one or more base stations 102, each of which are equipped with one or more antennas 104. Each of the antennas 104 provides wireless communication for user equipment 108 in one or more cells 106. As used herein, the term "base station" refers to a wireless communications station that serves as a hub of a wireless network. For example, in a Long Term Evolution (LTE) cellular network, a base station may be an eNodeB.

The base stations 102 may provide service for macrocells, microcells, picocells, or femtocells 106. FIG. 1 shows an embodiment in which base station 102 provides wireless communication services to three cells 106. The cells may be specific to a particular Radio Access Technology (RAT) such as GSM, UMTS, LTE, NR, etc.

Due to the directionality of some RF antennas 104, each base station 102 may serve a plurality of cells 106 arrayed about the base station site. In a typical deployment, a base station 102 provides three to six cells 106, which are deployed in a sectorized fashion at a site. In other embodiments, one or more base station 102 may be outfitted with an omnidirectional antenna that provides service to a single cell for a given RAT.

Multiple base stations 102 may be present at a site and each base station may support one or more cellular communications technologies (e.g., a base station may support UMTS and LTE cells). The one or more UE 108 may include cell phone devices, laptop computers, handheld gaming units, electronic book devices and tablet PCs, and any other type of common portable or fixed wireless computing device that are provided with wireless communications services by a base station 102.

The system 100 may include a backhaul portion 110 that can facilitate distributed network communications between core elements 112, 114 and 116 and one or more base station 102 within a cellular network. In an embodiment, the backhaul portion of the network includes intermediate links between a backbone of the network which is generally wire line, and sub-networks or base stations 102 located at the periphery of the network. The network connection between any of the base stations 102 and the rest of the world may initiate with a link to the backhaul portion of a provider's communications network. A backhaul 110 may include an X2 connection through which base stations 102 communicate with one another directly.

The core network devices 112, 114 and 116 may be any of a plurality of network equipment such as a Radio Resource Manager (RRM), a Mobility Management Entity (MME), a serving gateway (S-GW), a Radio Network Controller (RNC), a base station controller (BSC), a mobile switching center (MSC), a Self-Organizing Network (SON) server, an Evolved Serving Mobile Location Server (eS-MLC), a Home Subscriber Server (HSS), etc. Persons of skill in the art will recognize that core network devices 112, 114 and 116 are different depending on the particular RAT or set of RATs that are present in the network. The core network devices support a radio access portion of the network that includes the base stations 102.

Elements of the communications network 100 are part of an Element Management System (EMS) 120 and a Performance Monitoring (PM) system 122. The PM system 122 may include base stations 102 as well as core network equipment that collect and process performance data and performance metrics for the network. A spectrum analysis server 140 interfaces with various network components, including components of the PM system 122 and the EMS 120.

Although FIG. 1 shows the spectrum analysis server as a single, discrete component, embodiments are not so limited. For example, in other embodiments, components of the spectrum analysis server 140 may be distributed among multiple computing entities. In addition, hardware for the spectrum analysis server may perform processes not directly related to interference.

The performance monitoring system 122 generates performance data 126 for the wireless network. The PM data 126 may be derived from observations of network performance, which may be reported at a predetermined time interval, e.g., every minute, 5 minutes, 15 minutes, hourly or daily. PM data 126 may include raw event counts (e.g. counts of dropped calls or handover failures during the observation period) or complex derived performance indicators (e.g. noise rise normalized by user loading, Channel Quality Indicator (CQI) distribution statistics normalized by data volume, etc.). PM data 126 may include raw or aggregated performance data.

In some embodiments, PM data 126 includes data input from a dedicated PM tool, as well as data received directly from EMS 120, or elements of the Operations and Support System (OSS). In an embodiment, PM data 126 may be derived directly from network event data by the spectrum analytics server 140. For example, in an embodiment, when event data 136 is available to the spectrum analytics server 140, the server may aggregate individual events to create equivalent PM counters and Key Performance Indicators (KPIs). Thus, in some embodiments, PM data 126 is derived from sources other than a PM system 122.

Fault Management Data 128 may be transmitted from the PM system 122 to spectrum analysis server 140. Fault Management Data 128 includes, for example, alarm data that indicates performance issues at one or more cell site.

Configuration Management (CM) data 130 is input to the spectrum analysis server 140 from EMS 120. CM data 130 includes the current configuration of various wireless network equipment, such as the configuration of base stations 102 and core components such as Radio Network Controllers.

CM Data 130 is quasi-static and typically only changes as a result of deploying new network equipment, network optimization such as cell splitting, cell ID reassignment, changes in operating frequency or transmit power, etc. CM data 130 may include pertinent information such as cell technology (e.g., 2G GSM, 3G UMTS, 4G LTE, 5G NR) associated with physical and logical network elements, operating frequency, transmit power, reuse codes, type of cell (e.g. macro, micro, pico cell), and other information related to the configuration of the radio network elements.

Topology data 132 is data relating to the location and orientation of network elements, including information such as the antenna latitude and longitude of a base station 102, antenna height, pointing angle for sectorized antennas, antenna beamwidth, site deployment type (e.g. indoor, outdoor, distributed antenna system, etc.), etc. In addition to interference detection and characterization, topology data 132 may be used to aid in correlating PM data 126 and network event data 136 against actual physical locations, and for understanding physical distance and orientation relationships between network elements.

RF planning tool 124 has network planning information used to determine cell site positions and pertinent parameters such as sector pointing angles. Network parameters established via automated or manual network planning processes may be used to configure the actual network equipment and serve as source information for some of the CM data 130 and Topology data 132. Alternative embodiments may include a direct data connection between entities that perform RF planning functions and the spectrum analysis server 140, provided that the network CM data 130 and topology data 132 is available to support processes described in this disclosure.

Network event data 136 represents discrete network events that are typically logged by network elements. Network event data 136 may include information pertaining to the start and termination of phone calls, information regarding handover of UEs 108 between network cells 106, measurement reports sent by UEs to network elements, as well as periodic reporting at intervals of as low as several seconds or less between reporting periods. Network event data 136 may be available via a continuous streaming mechanism, or recorded and stored in files at network elements that contain, for example, fifteen to thirty minutes or more of network event data. Because event data 136 is typically timestamped with sub-second resolution, it can be used to determine variance of conditions over time at relatively short intervals, such as five minutes, one minute, 30 seconds, or as low as the reporting interval, which may be less than one second.

Network event data 136 may include call event data, or cell trace data according to LTE terminology. Call trace data includes information identifying makes and models of UEs 108, and is typically used by operators to determine device-specific network faults, e.g. that a particular cell phone model has an unusual rate of handover failures under certain conditions. Examples of call event data 136 include tracking area messages, request for retries, RSSI measurements, and protocol messages. Network event data 136 is not conventionally used for interference detection, characterization or localization.

Tools supporting the collection of network event 136 data may be configured to collect selected event types, or to subsample the messaging to a subset of active users. Smaller size network event files are useful in measuring implied loading on network data transport such as wireless base station backhaul. When properly configured, network events provide high resolution and near real-time information regarding the operation of targeted network base stations 102, which can be used as part of the interference detection processes described by this disclosure.

The collection point for network event data 136 varies between specific wireless technologies and may vary in vendor-specific implementations. For instance, network event data 136 is typically collected at the RNC entity in 3GPP defined 3G networks (i.e., UMTS, HSPA), but network event data 136 is collected by the eNodeB entity in 4G LTE systems. Network event recordings may be pulled directly from the network elements that store the events by the spectrum analysis server 140, or automatically stored on a separate data storage server, or staging server, such that external systems such as the spectrum analytics server 140 may access network event data 136 without incurring additional data loading on the network elements. Accordingly, it should be understood that network event data 136 may be collected, stored and retrieved in various ways in different embodiments.

The network event data 136 may be collected by a trace utility 134 that is integrated with a cellular network. Trace concepts and requirements are explained, for example, in the Third Generation Partnership Project (3GPP) Technical Specification TS 32.421.

An embodiment may use network event data 136. In such an embodiment, spectrum analysis may derive base station performance indicators directly from network event data 136 in conjunction with, or in place of inputs from a Performance Monitoring system 122. In such an embodiment, network event data records may be aggregated.

Embodiments of this disclosure may utilize additional information sources beyond the sources illustrated in FIG. 1, such as information provided by SON (Self Organizing Network) tools, including analysis and insight into neighbor relationships not readily apparent from the sources listed above. Additional external integrations may also include radio frequency propagation planning tools that may be used to enhance accuracy of interference detection and interference localization.

Also shown in FIG. 1 is a plurality of energy sensing probes 118, which may be dedicated to the task of sensing energy in particular frequencies and reporting energy detection results. Energy sensing probes 118 may be installed at various locations in a network, and may be tuned to detect energy on one or more frequencies that are used for wireless communications. Although embodiments of this disclosure do not require the deployment of dedicated energy sensing probes 118, their use is not precluded.

In an embodiment that uses dedicated energy detection probes 118, energy measurements derived directly from the detection probes are used in conjunction with or in place of energy measurements derived from network event data 136 as inputs to the spectrum analytics server 140. Subsequently, the measurements from dedicated energy detection probes 118 may be correlated with known probe positions and probe configuration characteristics (e.g. directional antennas) as well as current network loading data to enhance the detection of undesired radio frequency interference within the network.

Probe data may in some cases be broadband and cover wider spectrum segments than the operational wireless network, and as such may be used to monitor bands adjacent to or even highly separated from current wireless bands. Such broadband spectrum analytics sensing may be used to support frequency agile spectrum sharing solutions whereby internal band metrics, e.g. network event data correlated with topology and CM data, as well as probe supported broad band metrics, to enhance performance of spectrum analytics.

The spectrum analysis server 140 represents a specific processing device that interfaces with one or more of the external data sources described above. The spectrum analysis server 140 may perform one or more of anomaly and interference detection, analysis, comparison, characterization and localization processes described in this disclosure. In an embodiment, the spectrum analysis server 140 is physically located in an operator's Network Operations Center (NOC). From a logical perspective, the spectrum analysis server 140 is located in the Operations Support System (OSS) plane. The spectrum analysis server 140 may perform one or more of the specific processing steps described below.

Figure 2:
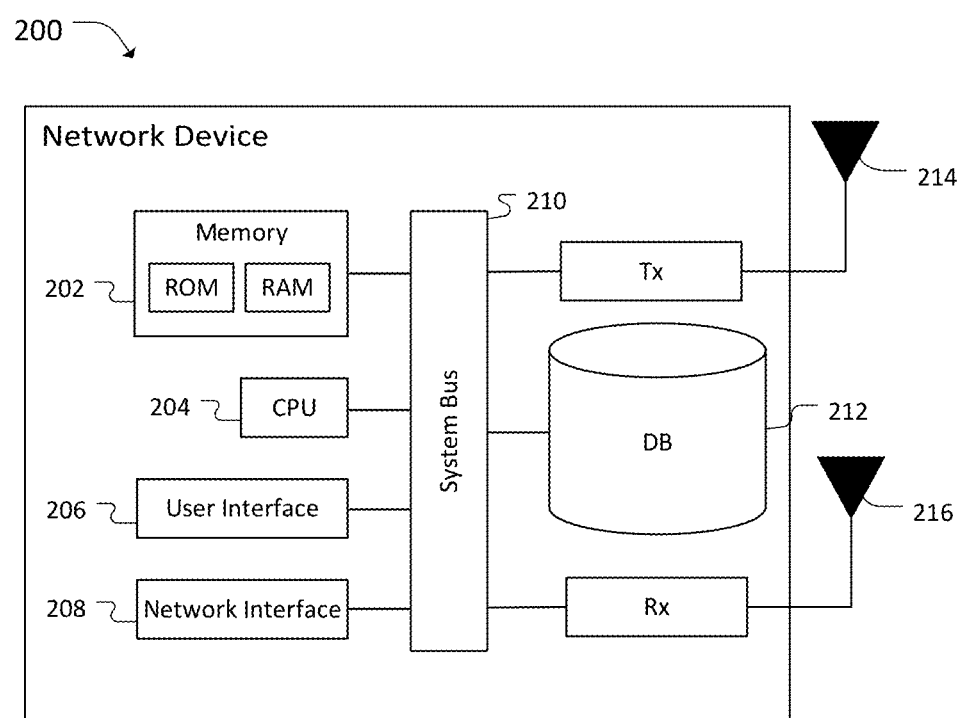
FIG. 2 illustrates a network device according to an embodiment.

FIG. 2 illustrates a block diagram of a network device 200 that may represent UE 108, network controller devices 110, 112 and 114, a spectrum analysis server 140, etc. The network device 200 has one or more processor devices including a CPU 204. The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. The storage device 212 and ROM of memory 202 are non-transitory computer readable media that may have computer executable instructions stored thereon which, when executed by the CPU 204, cause the network device to perform one or more operations according to embodiments of the present disclosure.

The network device 200 may also include a user interface 206 that allows a user to interact with the network device's software and hardware resources and to display the performance and operation of the system 100. In addition, the network device 200 may include a network interface 206 for communicating with external devices, and a system bus 210 that facilitates data communications between the hardware resources of the network device. If the Network device 200 has wireless connectivity, it may have a transmitter 214 and a receiver 216, each of which may include one or more antennas that operate on one or more frequencies.

Wireless network nodes in telecommunication networks make periodic measurements of interference. The interference measurements can be used to adapt network parameters to optimize performance in the presence of interference. However, it is important to characterize the interference in order to implement appropriate optimization processes.

Causes of highly localized non-network interference include sparking transformers and industrial machinery. In addition to localized non-network interference, cells experience interference from transmissions within the network itself.

Processes used to handle localized non-network interference are different from processes used to handle interference from within the network. Non-network interference is typically handled by locating and eliminating the interference source. For example, interference from a sparking transformer can be mitigated by replacing the transformer. Network interference can be handled in a number of ways, including adjusting network parameters such as power, frequency, antenna azimuth and beamwidth, and changing how transmissions are scheduled. In order to implement the most effective processes for handling interference, it is important for networks to accurately detect and characterize the interference.

Anomalous behavior in a wireless network is generally identified by comparing measured values with values that are typical of the measurements and flagging values that have large deviations from the typical behavior. However, comparing sets of values with each other requires different techniques than techniques that are used for comparing single values. In addition, due to the inherent instantaneous variability of the wireless environment, it may be more effective to compare statistics of measurements over the observation period rather than the sequence of observations over the observation interval.

Figure 3:
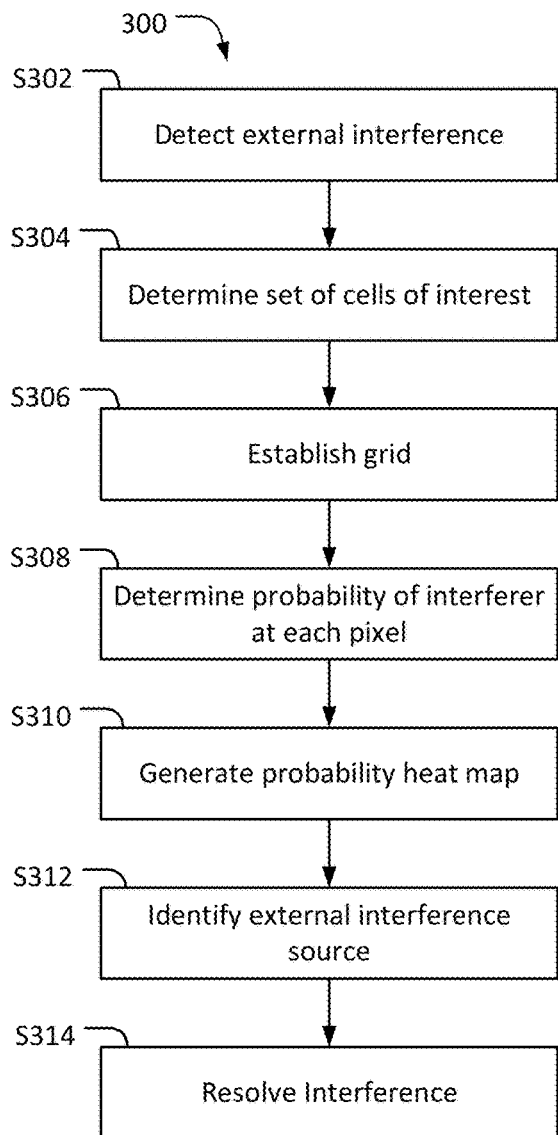
FIG. 3 illustrates an embodiment of a process for determining a location of an external source of interference at a cell site.

FIG. 3 illustrates an embodiment of a process 300 for determining a location of an external source of interference at a cell site. The process may initiate when external interference is detected at S302. Wireless operators are licensed to use specific frequencies in the RF spectrum, and interference caused by normally scheduled transmissions within the operator's wireless network is internal interference. In contrast, external interference is interference that is caused by equipment that is external to the operator's wireless network. There are many possible sources for external interference, including unlicensed or malfunctioning transmitters, industrial operations, sparking transformers, etc.

Techniques for detecting interference at cell sites, e.g. Signal to Interference plus Noise Ratio (SINR) measurements, are known in the art and can be applied at this step. Interference measurements that are collected and stored by the network as PM data do not typically separate network interference from external interference. Various techniques can be applied for differentiating network interference from external interference as known in the art, such as correlating interference measurements, and measuring interference during coordinated interference times as described in U.S. Pat. No. 9,572,055.

Normally, interference measurement data stored in network elements includes not only the external interference signal, but also traffic interference coming from mobile users connected to neighbor cell sites as well. Hence, processes may be performed to separate external interference magnitude from the combined measured interference data at each network element. For purposes of the present disclosure, the technique employed at S302 characterizes external interference sufficiently to determine that the interference is external to the wireless network and strength of the interference at a plurality of network nodes.

After external interference is determined to be present in a network area, a set of cells of interest 402 is selected at S304. In an embodiment, the cells of interest are cells that are affected by the interference, and more specifically cells at which external interference is detected. For example, when coordinated quiet times for specific frequencies are used to determine that external interference is present, the set of cells may include every cell that detects a signal above the noise floor in the specific frequencies at the quiet times.

Figure 4:
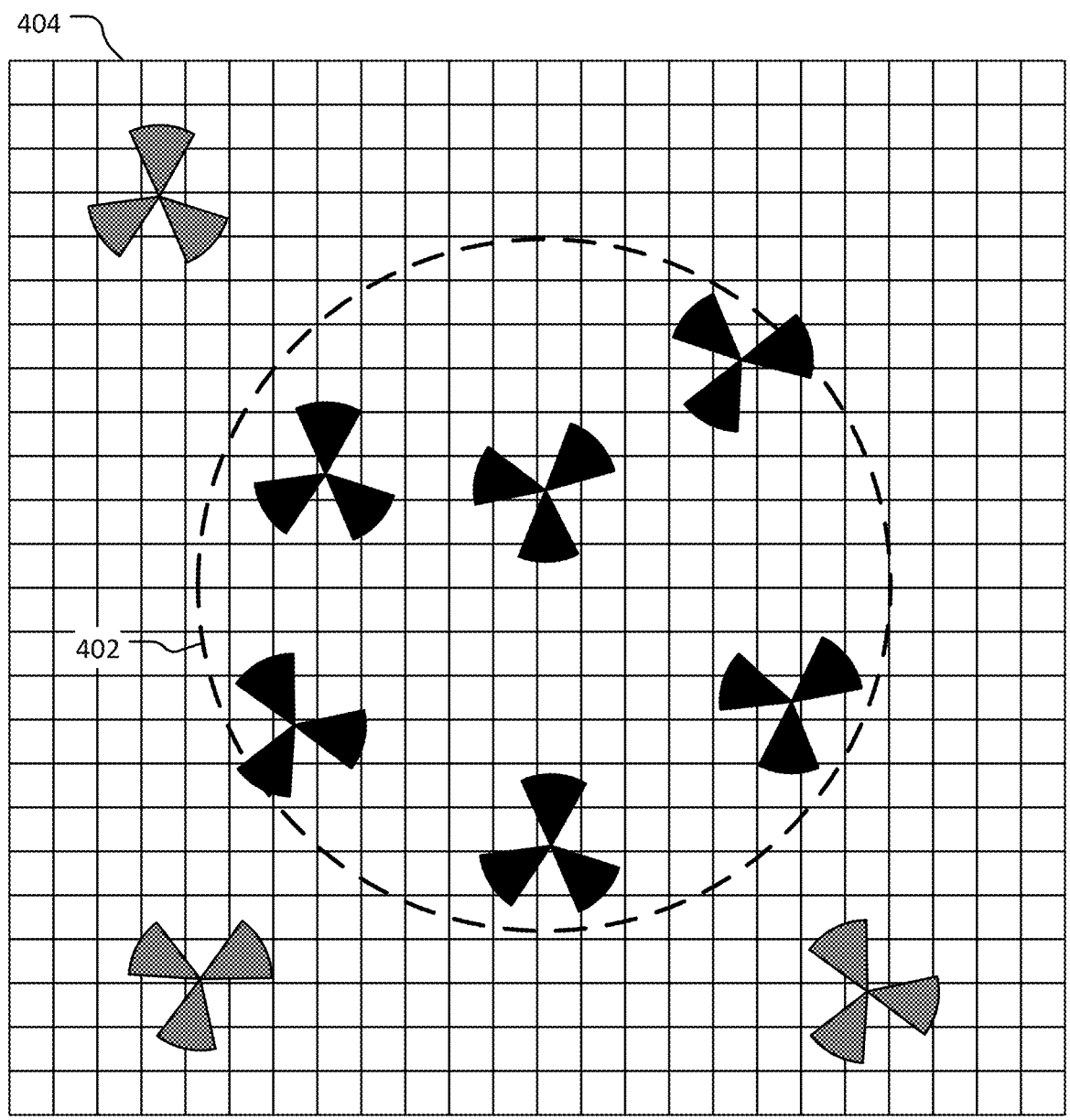
FIG. 4 illustrates an embodiment of a grid pattern around cells of interest.

After cells of interest are determined at S304, a grid pattern 404 is established around the cells of interest at S306. The grid pattern establishes a pattern of points around the cells of interest. FIG. 4 illustrates an embodiment of a grid pattern 404 that is established around the set 402 of cells of interest.

The size and density of the grid points may vary between embodiments. The grid is to establishes a set of sectors, or pixels, for which a probability that an interference source being present is calculated. Because interference is evaluated for each pixel in a grid, a lower grid density minimizes the number of calculations performed, while a higher grid density increases the resolution of a result.

The grid should be large enough to encompass the actual location of an interference source. It is unlikely that an interference source is located near unaffected cells, so the extent of a grid may be determined based on an area that encompasses all of the cells of interest 402. In some embodiments, grid coordinates, e.g. geographic locations corresponding to a grid, can be set and adjusted by a user. For example, if a user selects a first grid size that does not have any pixels with high probability values, the user could create a larger grid. Other embodiments may automatically generate a grid, e.g. by establishing a geographic area that larger than affected cells by a predetermined value. Although FIG. 4 shows grid 404 using cartesian coordinate lines, other shapes are possible.

Figure 5:
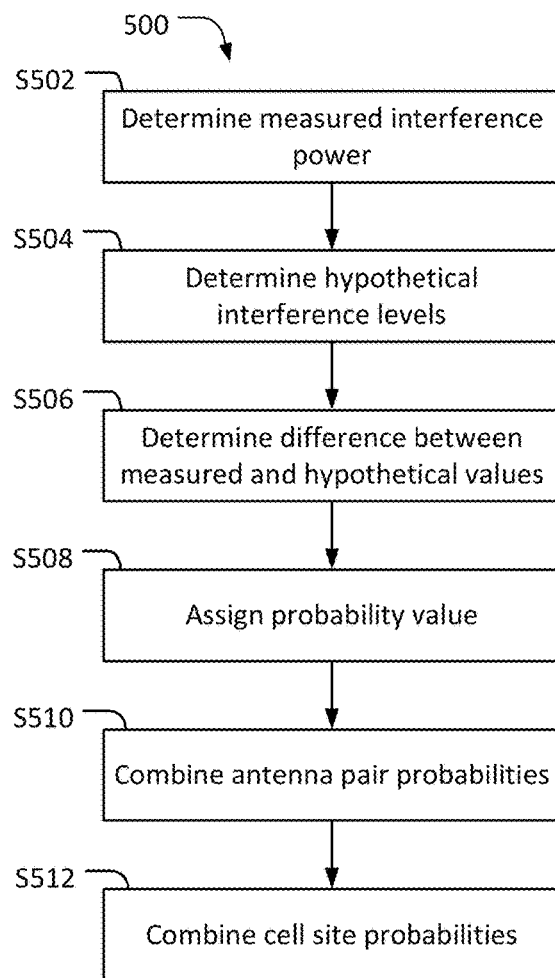
FIG. 5 illustrates an embodiment of a Bayesian process for determining probabilities.

A probability for the of a source of interference being located at each pixel in a grid is determined at S308. FIG. 5 illustrates a Bayesian process 500 for determining probabilities for the source of interference being located at each pixel.

Power values for receivers that detect interference are determined at S502. Power values may be determined for every antenna that has detected a level of interference above the noise floor. The interference magnitudes from all cells of interest may be expressed as:

$$P_R = \{[P_1^1, P_2^1, \ldots, P_{L_1}^1], [P_1^2, P_2^2, \ldots, P_{L_2}^2], \ldots, [P_1^N, P_2^N, \ldots, P_N^N]\},$$

where $P_j^i$ is the measured interference magnitude at i-th site and j-th sector cell, $L_i$ is the number of sector cells at the i-th site and N is the total number of affected cell sites. In an embodiment, only cell sites that have two or more sector cells are analyzed.

For each cell site, interference magnitude differences may be calculated and stored as follows:

$$\Delta P_R = \{[\Delta P_1^1, \Delta P_2^1, \ldots, \Delta P_{L_1}^1], [\Delta P_1^2, \Delta P_2^2, \ldots, \Delta P_{L_2}^2], \ldots,$$
$$[\Delta P_1^N, \Delta P_2^N, \ldots, \Delta P_{L_N}^N]\}$$
$$= \{[P_1^1 - P_2^1, P_2^1 - P_3^1, \ldots, P_{L_1}^1 - P_1^1], \ldots,$$
$$[P_1^N - P_2^N, P_2^N - P_3^N, \ldots, P_{L_N}^N - P_1^N]\}$$

Hypothetical interference magnitude values are determined at S504. In an embodiment, hypothetical interference magnitude values are determined for every cell of interest and every pixel in a grid 404. A hypothetical interference magnitude may reflect expected interference measurements at a cell site if an interference source exists at a given pixel.

When a site receives interference from an external source, the measured interference power depends on several link gain components, such as pathloss, transmit power, and antenna gain. For example, receiver interference power can be expressed as follows:

$$P_R = P_T + G_T + G_R - L_T - L_R - PL,$$

where,
 $P_T$ is an external interferer's transmit power in dB,
 $G_T$ is transmit antenna gain at the interferer in dB,
 $G_R$ is receiver antenna gain at the cells in dB,
 $L_T$ is signal loss at the transmitter, e.g., cable loss, in dB,
 $L_R$ is signal loss at the receiver, e.g., cable loss, in dB, and
 PL is pathloss from the radio channel, including shadowing, in dB.

Typically, no information is available for characteristics $P_T$, $G_T$, and $L_T$ of a source of external interference. On the other hand, receiver information $G_R$, $L_R$ is available to an operator, and pathloss values can be estimated with a relatively high degree of accuracy, especially in consideration of known base station and geographic characteristics.

For a given site, receiver signal power at two different cells can be expressed as:

$$P_{R1} = P_T + G_T + G_{R1} - L_T - L_{R1} - PL_1,$$

$$P_{R2} = P_T + G_T + G_{R2} - L_T - L_{R2} - PL_2.$$

Considering the difference, $P_{R1} - P_{R2}$, transmitter details are canceled out as follows:

$$\Delta P_R = P_{R1} - P_{R2} = (G_{R1} - G_{R2}) - (L_{R1} - L_{R2}) - (PL_1 - PL_2)$$

In general, cable losses at different base stations can be assumed to be the same without substantially compromising location accuracy. Hence, the $\Delta P_R$ can be expressed as:

$$\Delta P_R = (G_{R1} - G_{R2}) - (PL_1 - PL_2)$$

When the two cells are in the same site, the last term, $(PL_1 - PL_2)$, is also canceled out because pathloss and shadowing values are considered to be the same for cells of the same cell site.

$$\Delta P_R = (G_{R1} - G_{R2})$$

Accordingly, receiver power deltas may be calculated for specific pairs of cells. More specifically, receiver power deltas may be determined for each pair of cellular antennas for a given cell site. When a cell site is a three-sector site and external interference is detected at every sector of the cell site, hypothetical receiver power values are calculated for all three combinations of antenna pairs. However, in an embodiment in which a cell site provides service to more than three cells, receiver gains need not be calculated for non-adjacent antenna pairs. In one embodiment, only adjacent pairs of antennas are evaluated for a cell site.

Figure 6A:
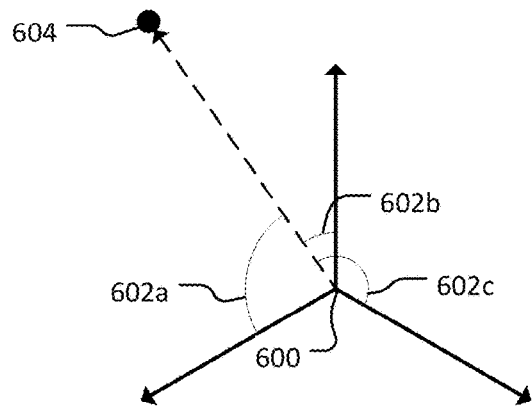
FIG. 6A illustrates angles of arrival for antennas of a three-sector cell site.

FIG. 6A illustrates a three-sector cell site 600, and angles 602a, 602b and 602c, which are respective angles between pointing directions of antennas of the cell site and the location of a pixel 604. The receiver antenna gain, $G_R$, can be obtained by calculating the Angle of Arrival (AoA) 602 from the pixel to the receiver azimuth direction. In an embodiment, the AoA may be established to a center of each pixel.

After AoA values are obtained for each antenna, receiver antenna gain for each antenna can be obtained using an antenna pattern. The antenna pattern may be a generic pattern such as the pattern expressed by the following formula:

$$G_R = -\min\left(12 \times \left(\frac{AoA}{HPBW}\right)^2, Am\right)$$

in which HPBW is half-power beam-width and Am is a minimum antenna gain level, for example, −25 dB. Alternatively, the antenna pattern may be provided as a lookup table of gain values. For example, a lookup table may be created with a resolution of one value per degree for a total of 360 values. In such an embodiment, the antenna gain for a given angle of arrival can be obtained using the lookup table. In addition, an embodiment may apply interpolation for angles falling between the values listed in the table.

Once antenna gains at each cell from every pixel in a grid (k, k=1, ..., M) are obtained, hypothetical data of relative interference magnitudes is determined ($\Delta H_R$ (k)), with an assumption that an external interference exists at a k-th pixel in the grid area, using the known information for the data created from measurement data, $\Delta P_R$ as shown in the following equation:

$$\Delta H_R(k) = \{[\Delta H_1^1(k), \Delta H_2^1(k)], \ldots,\\ \Delta H_{L_1}^1(k)], \ldots, [\Delta H_1^N(k), \Delta H_2^N(k), \ldots, \Delta H_{L_N}^N(k)]\}$$

in which, for example, $\Delta H_j^i(k) = G_{Ri,1}(k) - G_{Ri,2}(k)$, is the hypothetical receiver power difference between sector 1 and sector 2 at the i-th site and $L_i$ is the number of cells at the i-th site, i=1, 2, ..., N. Thus, hypothetical values are established at S504 for pairs of antennas for each cell site.

When one or more measured interference level is equal to the noise floor level and the sector index that gives highest hypothetical receiver antenna gain matches with the highest measured interference magnitude sector, the hypothetical interference differences between the highest interfered sector and those sectors with noise floor level of interference may be adjusted to have the same magnitude differences as measured magnitude. In this way, a localization algorithm can identify a range of angles where interference is arriving even when some of measurement data are submerged by the noise floor. An example of this is shown in FIG. 6B.

Figure 6B:
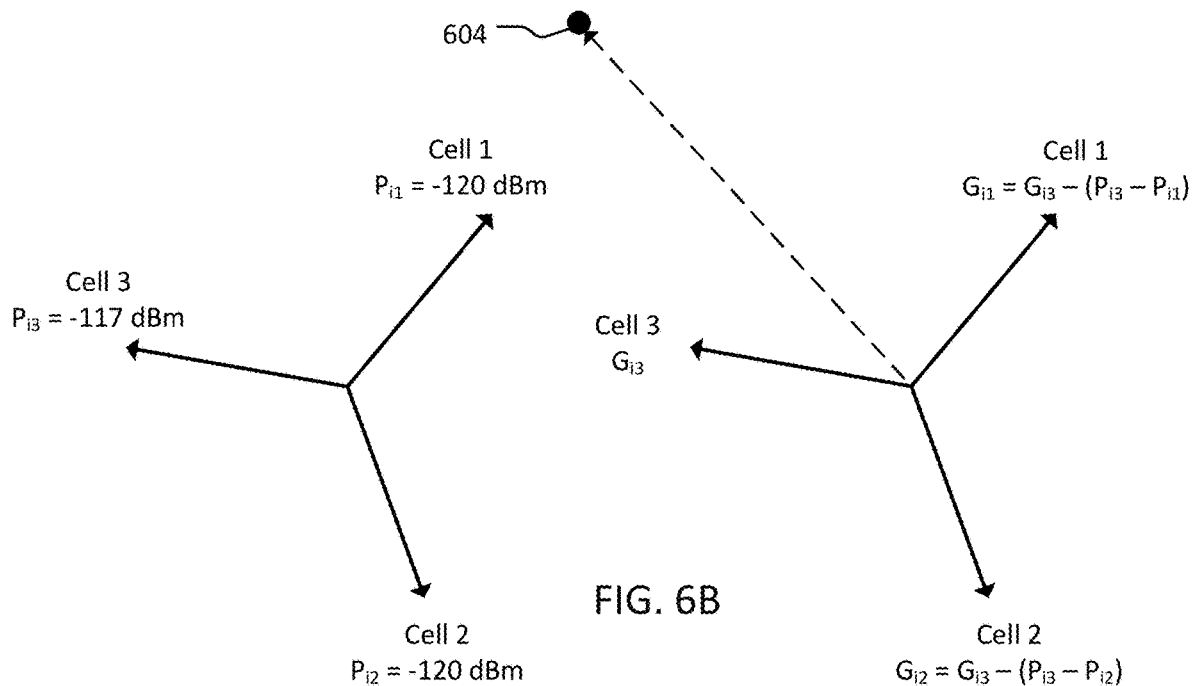
FIG. 6B illustrates antenna gain for the three-sector cell site.

FIG. 6B illustrates an embodiment of determining hypothetical antenna gain values when noise-floor saturation is present. In that embodiment, a hypothetical antenna gain value of 0 dB is determined for Cell 3 based on pixel location 604, and lower values, e.g. −10 dB and −20 dB are determined for cells 1 and 2. However, actual measured data from cells 1 and 2 is limited by the noise floor of −120 dBm. In such a situation—where measured power is limited by the noise floor—hypothetical antenna gain values of the cell site 600 are adjusted based on the measured data. Resulting hypothetical gain values for the cell site in FIG. 6 would therefore be 0 dB for Cell 3, and −3 dB for Cell 1 and Cell 2. Accordingly, an embodiment may adjust hypothetical antenna gain values when those values fall below the noise floor, so that cell sites with measurements below the noise floor can be used to improve the results of localization.

When conventional techniques are applied, and an antenna's measurements are limited by the noise floor, that antenna is effectively a nullity that cannot be used to determine location. Thus, when two antennas of a three-sector cell site do not detect a signal above the noise floor, the cell site cannot contribute to localization using conventional techniques that employ angular data based on multiple antennas of a cell site. In contrast, as described above, embodiments of the present disclosure can use measurements from every antenna that registers a signal to localize interference, even when one or more of the measurements from co-sited antenna are limited by the noise floor.

Embodiments of the present disclosure apply a Bayesian approach to probability by determining probabilities for a plurality of hypotheses, where each pixel location represents a hypothesis that an interference source is located at that pixel location. After having measured data $\Delta P_R$, and hypothetically created data for each pixel k, $\Delta H_R(k)$, where k=1, ..., M, M being the total number of pixels in the grid area. With a set of measurement data, P (=$\Delta P_R$) and hypothetical data, H(k)(=$\Delta H_R(k)$), the probability of external interference being existing at the k-th pixel can be expressed as:

prob(k)=prob(H(k)|P)∝prob(P|H(k))·prob(H(k))∝prob(P|H(k)).

The expression above uses proportionality instead of equality and also omits the denominator prob(P) and prob(H(k)) because they are constants.

The probability of interference existing at each pixel may be determined using measurement data and hypothetical data. The hypothetical interference values can be compared to measured values at S508 to determine the likelihood that an interference source is present at a given pixel, where closer matches between hypothetical data and measured data suggest higher probabilities that an interferer is present at an associated pixel. Since the equations described above remove unknown factors such as interference transmit power and pathloss amount, the pixel whose H(k) matches with P will give probability of '1' in theory. However, there are still a number of factors that lead to differences between the measurement and hypothetical data, such as errors in measurement, differences in antenna models, etc.

Hence, inferring the location of interference may be achieved by reallocating the probability at each pixel (k) per site (i) as follows.

$$prob(P \mid H(k)) = \prod_{i=1}^{N} prob(\Delta \overline{P}^i, \Delta \overline{H}^i(k))$$

where N is the total number of affected sites with two or more sector cells, $\Delta \overline{P}^i=[P_1{}^i-P_2{}^i, \ldots, P_{L_i}{}^i-P_1{}^i]$, and $\Delta \overline{H}^i(k)=[\Delta H_1{}^i(k), \Delta H_2{}^i(k), \ldots, \Delta H_{L_i}{}^i(k)]$ for an i-th site, where $L_i$ is the number of sector cells at the i-th site.

A probability, prob($\Delta \overline{P}^i$, $\Delta \overline{H}^i(k)$), can be obtained for each pixel using a hypothesis that differences between $\Delta \overline{P}^i$ and $\Delta \overline{H}^i(k)$ at the i-th site are caused by the randomness of radio environment and measurement devices even though interference actually exists at the pixel, k. As for the randomness of radio environment and measurement devices, embodiments assume a normal distribution with a standard deviation of $\sigma$.

The probability created from each site, prob($\Delta \overline{P}^i$, $\Delta \overline{H}^i(k)$) can be expressed as:

$$prob(\Delta \overline{P}^i, \Delta \overline{H}^i(k)) = \prod_{l=1}^{L_i} \int \int_{x=\Delta P_l^i - \Delta H_l^i(k)} \frac{1}{\sigma\sqrt{2\pi}} \exp\left[-\frac{x}{2\sigma^2}\right] dx$$

in which $L_i$ is the number of sector cells at the site i, and $L_i \geq 2$. Since the distribution function is continuous, the probability of x exactly matching with $\Delta P_l{}^i-\Delta H_l{}^i(k)$ will be zero.

In an embodiment, probability values may be applied from a limited set of values, or bins, based on a number of standard deviations between measured and hypothetical values at S508. As explained above, the standard deviation here theoretically represents randomness in a number of variables. However, the specific value of the standard deviation is not the result of a calculation—rather, a value can be assigned to the standard deviation by a user. Persons of skill in the art will recognize that it is possible to assign various values to the standard deviation to affect the results of process 500.

Figure 7:
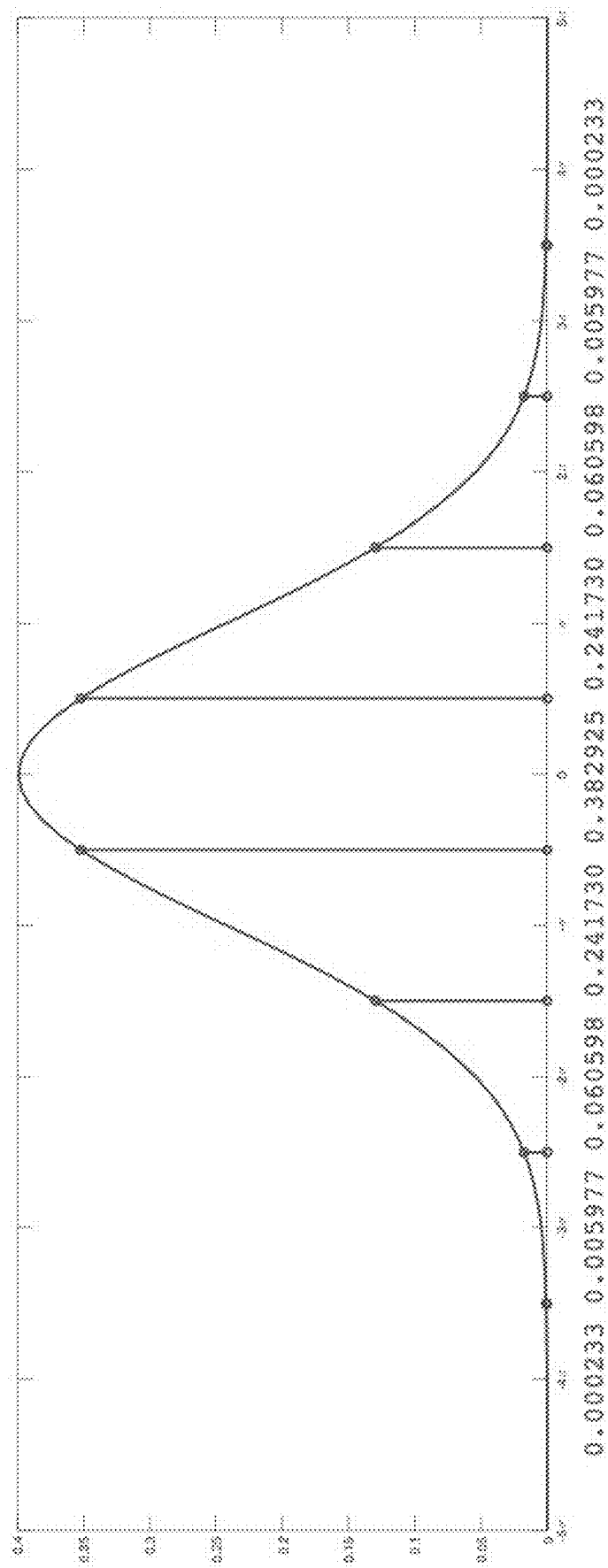
FIG. 7 illustrates a segmented normal distribution.

A probability distribution function can be used to establish a probability for $\Delta P_l{}^i-\Delta H_l{}^i(k)$ falling within a particular range of values, as opposed to taking on any one specific value. FIG. 7 illustrates a normal curve that is divided into 9 separate bins. Embodiments are not limited by this specific example—in other embodiments, different divisions are possible. In an embodiment according to FIG. 7, when the value of $\Delta P_l{}^i-\Delta H_l{}^i(k)$ falls within a centered standard deviation $[-\sigma/2, \sigma/2]$, the probability will be 38.2925%. Therefore, when the hypothetical interference value for a pixel is plus or minus one half standard deviation from the measured value, a probability value of 0.382925 is assigned to that pixel. Accordingly, higher probability values are assigned to pixels when the difference between measured values and hypothetical values is lower, and vice versa.

After probability values have been determined at each pixel for each pair of antennas with measurements above the noise floor, the probability values for antenna pairs at each cell site are combined at S510. In an embodiment, the probability values are combined multiplicatively so that pixel values for each cell site are the product of all valid antenna pair probabilities for the cell site. In some embodiments, the probability values may be scaled to adjust the difference between the highest and lowest probability values.

Figure 8C:
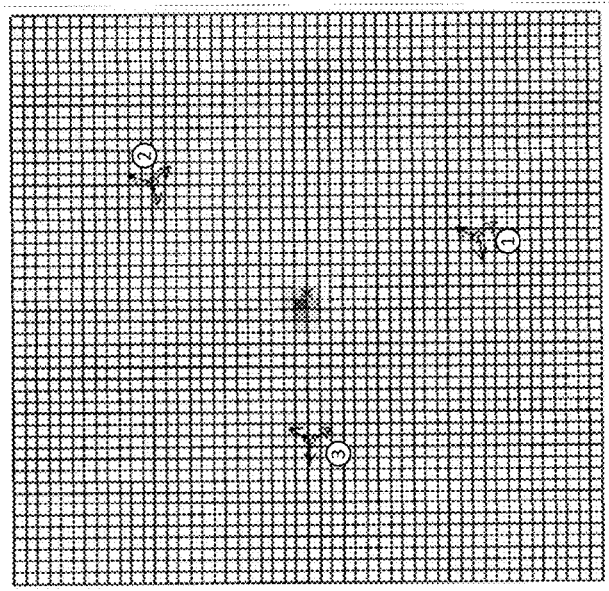
FIG. 8C illustrates pixel probabilities for three cell sites.
Figure 8B:
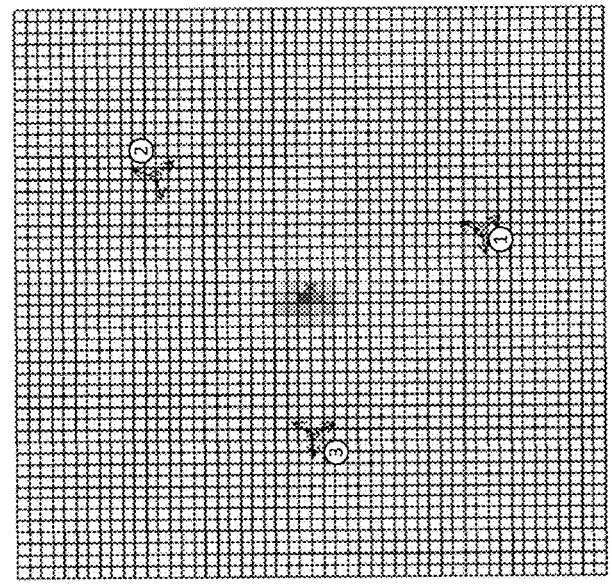
FIG. 8B illustrates pixel probabilities for two cell sites.
Figure 8A:
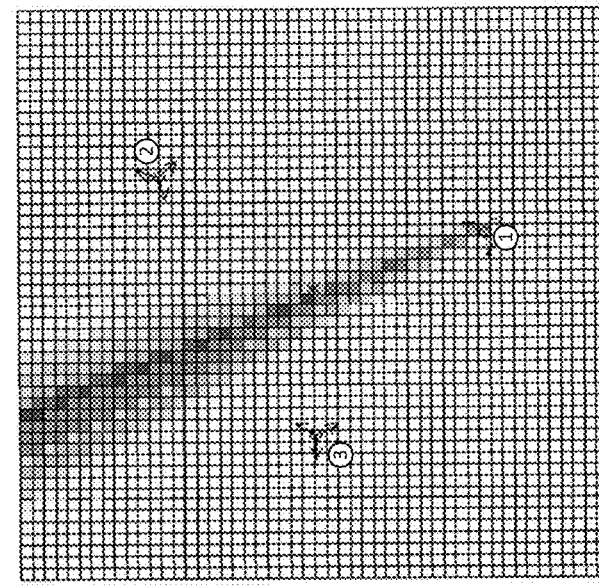
FIG. 8A illustrates pixel probabilities for a single cell site.

Probability values for all cell sites are combined at S512. FIGS. 8A-8C illustrate an example of re-assigning probability values for each pixel after calculating joint probability site by site. In FIGS. 8A-8C, dark colored squares represent probability of external interference being at the associated location, or pixel. The probability values are scaled to the shade of the squares, so that squares representing pixels with a higher probability have a darker shade than squares that represent lower probabilities. FIG. 8A illustrates probability values for all the pixels in the grid are obtained from data at cell site 1 resulting from combining antenna pair probability values at S510.

FIG. 8B illustrates probability values that have been re-assigned after calculating joint probabilities with data for site 2. In other words, FIG. 8B represents a combination of probabilities for site 1 and site 2. Finally, FIG. 8C shows the final probability values for each pixel in the grid using combined probability data from cell sites 1, 2 and 3.

Figure 10:
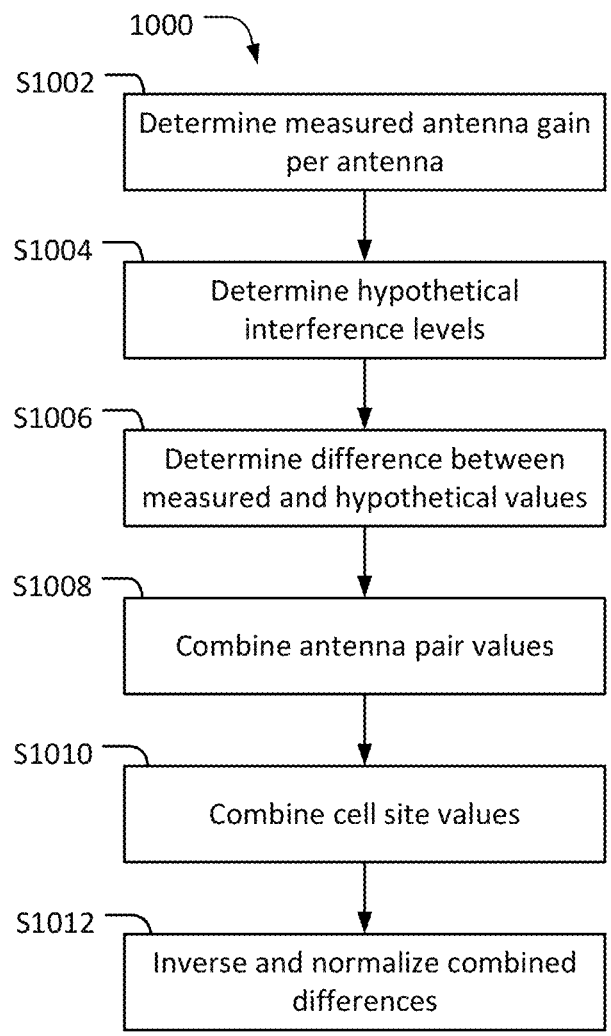
FIG. 10 illustrates a process for determining probabilities using Euclidian distance.

In another embodiment, determining the probability of an interferer at each pixel at S308 may be performed by determining a Euclidian distance between measured and hypothetical values. FIG. 10 illustrates an embodiment of a process 1000 of determining probability values for pixels in a grid using Euclidian distance.

In process 1000, determining measured antenna gain for each antennal at S1002 and determining hypothetical interference values at S1004 may be performed using the same measurement data $\Delta P_R$ and hypothetically created data for each pixel k, $\Delta H_R(k)$ from S502 and S504. Probabilities of an interference source being located at each pixel in a grid can be found based on Euclidean distances between measurement data and hypothetical data at S1006. For example, Euclidian distance for each pixel can be calculated as:

$$E\_dist\_k = \sum_{i=1}^{N} \sum_{l=1}^{L_i} (\Delta P_l^i - \Delta H_l^i(k))^2$$

In this equation, the hypothetical interference magnitude vectors are compared directly to measured interference vectors, and the differences between the vectors are characterized as the Euclidian distance between the vectors. In addition, determining differences between signal strength measurement data and the hypothetical values to determine the respective probability values at S1006 may include raising the differences to some power. In the example shown in the above equation, the power is two, but other powers are possible. After calculating distance values E_dist_k for each pixel for each antenna pair, the distance values for all pixels for each pair of antennas may be combined at S1008, and the distance values for each cell site are combined at S1010. Combining the distance values may include, for example, determining respective products of distance values for each pixel.

Because smaller Euclidian distance values represent a higher probability of a source of interference being located at a given pixel, the values resulting from S1010 are inversely proportional to the actual probability values. In other words, a smaller combined distance value for a pixel represents a higher probability of an interference source being located at that pixel. Accordingly, an additional step of inversing and normalizing the distance values may be performed at S1012 so that the scale of distances more closely matches the scale of probabilities represented by the distances.

The resulting probability values from process 1000 may be used to generate a probability heat map at S310. In an embodiment, the heat map is generated using values which are inversed and normalized at S1012. In other words, a process for creating a graphical representation of probabilities for each pixel on a grid involves making the pixel that yields smallest difference values between actual measurements and hypothetical data as the highest probable location of external interference. In an embodiment, inversing the differences to determine probability values is generally represented by the following equation:

$$prob(k) = \frac{1}{E\_dist\_k} \bigg/ \max\left(\frac{1}{E\_dist\_k}\right)$$

Other embodiments of determining probabilities using Euclidian distance are possible. Even though the distance values from S1006 are inverse to a conventional probability scale, it is possible to create a heat map that is useful to a wireless operator by applying an inverse graphical scale, and/or using a non-linear graphical scale. Additional operations, e.g. logarithmic scaling, may be performed on the combined site values to provide a useful graphical or numeric output, such as the heat maps shown in FIG. 11 and FIG. 12.

In the process 500 described above, each pixel is assigned a single probability value. However, depending on how the grid is established at S306, each pixel may represent a significant geographical area. Therefore, in an embodiment, a process 500 of determining probability can be implemented that accounts for a range of probability levels that could be encompassed by the area represented by a single pixel.

Figure 9B:
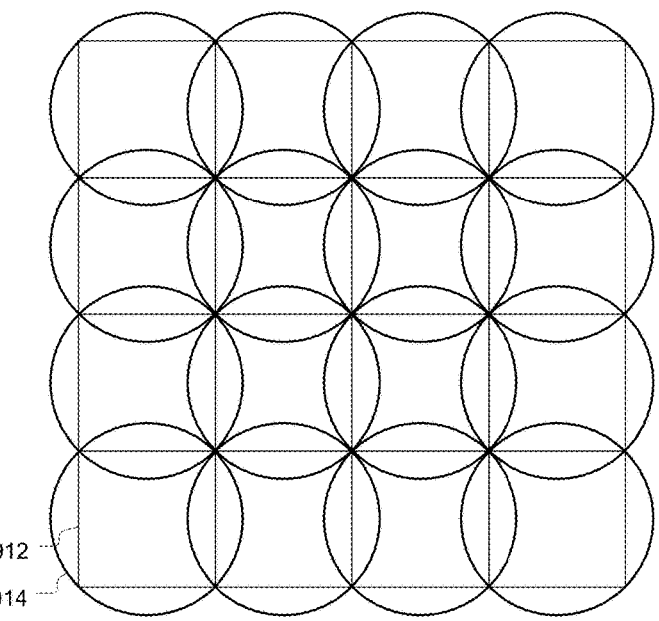
FIG. 9B illustrates pixel shapes circumscribed by circles.
Figure 9A:
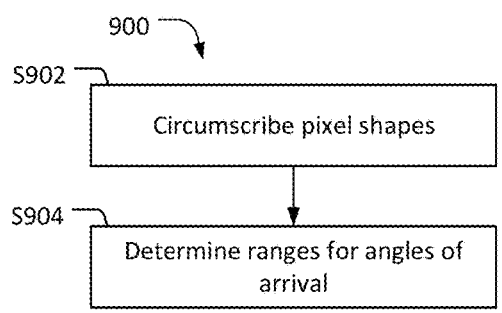
FIG. 9A illustrates a process for determining a range of an angle of arrival for a pixel.

FIG. 9A shows a process 900 of determining a range of an angle of arrival for a pixel that may be performed as part of step S504 of determining hypothetical interference values. As seen in FIG. 9B, pixel shapes 912 are circumscribed with circles 914 at S902. Although the shapes shown in FIG. 9B are squares, other shapes are possible, such as hexagons or triangles.

When the Angle of Arrival to a cell is ϕ, the range of a hypothetical AoA for a pixel can be expressed as [ϕ−θ, ϕ+σ], where $$\theta = \frac{\pi}{2} - \cos^{-1}\left(\frac{R}{d}\right).$$

Figure 9C:
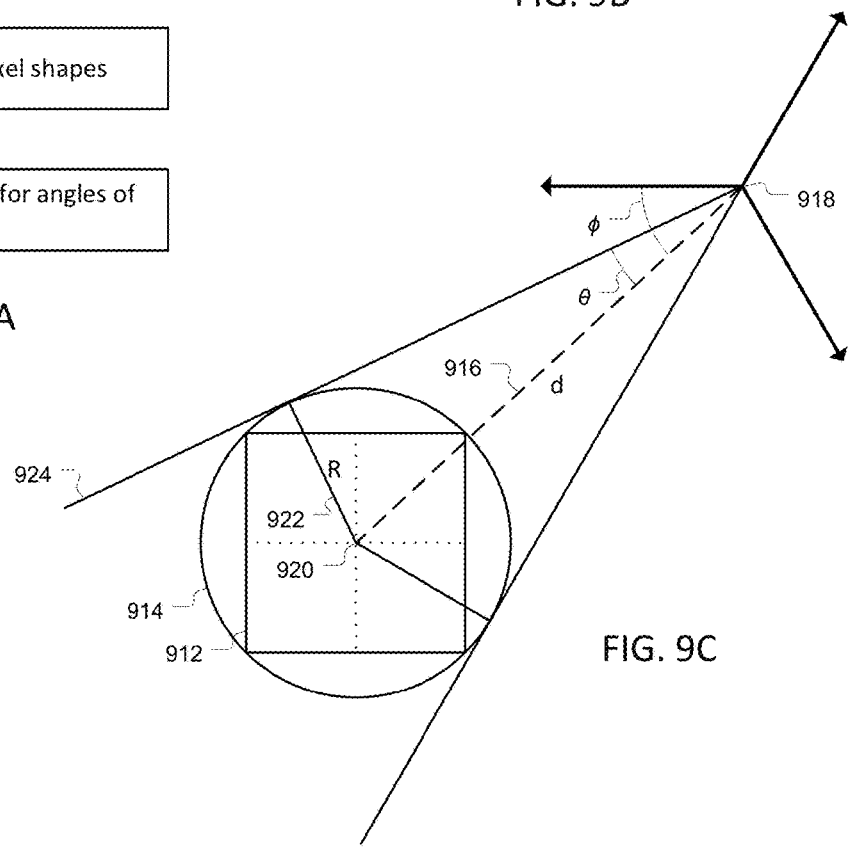
FIG. 9C illustrates a cell site in relation to a circumscribed pixel.

As seen in FIG. 9C, θ is the angle between line 916 that runs between a location of cell site 918 and the center point 920 of a pixel, and line 922 that is tangential to circle 914 and runs through the location of cell site 918. Here, ΔH$_I^i$(k) may be obtained with these hypothetical AoA ranges, and maximum and minimum values of (ΔP$_I^i$−ΔH$_I^i$(k)) may be used as a range to determine a probability from the probability distribution function.

Ranges of ΔP$_I^i$−ΔH$_I^i$(k) values, e.g. determining (ΔP$_I^i$−ΔH$_I^i$(k))$_{min}$ and (ΔP$_I^i$−ΔH$_I^i$(k))$^{max}$ for each pixel may be determined at S904. In an embodiment that accounts for range, ranges may be applied to assign probability values at S508 by applying the calculated range directly to the following equation:

$$prob(\Delta \vec{P}, \Delta \vec{H}^i(k)) = \prod_{l=1}^{L_i} \int \int_{(\Delta P_l^i - \Delta H_l^i(k))_{min}}^{(\Delta P_l^i - \Delta H_l^i(k))_{max}} \frac{1}{\sigma\sqrt{2\pi}} \exp\left[-\frac{x}{2\sigma^2}\right] dx$$

Pixels are represented as squares 902, and circles 904 are circumscribed around each square pixel. The circumscribed circle 914 presents a uniform size (diameter) from every possible location on the grid of pixels, so that angular calculations are not affected by the uneven profile of a square.

AoA ranges for pixels diminish in proportion to distance from a cell site. Therefore, an effect of accounting for pixel range is that closer pixels have a larger AoA ranges, resulting in higher probability values than pixels that are farther from a cell site. Diminishing probability according to distance may reflect variability in a radio environment, where larger distances have a higher probability of being occupied by objects or terrain that affects the radio environment.

Figure 11:
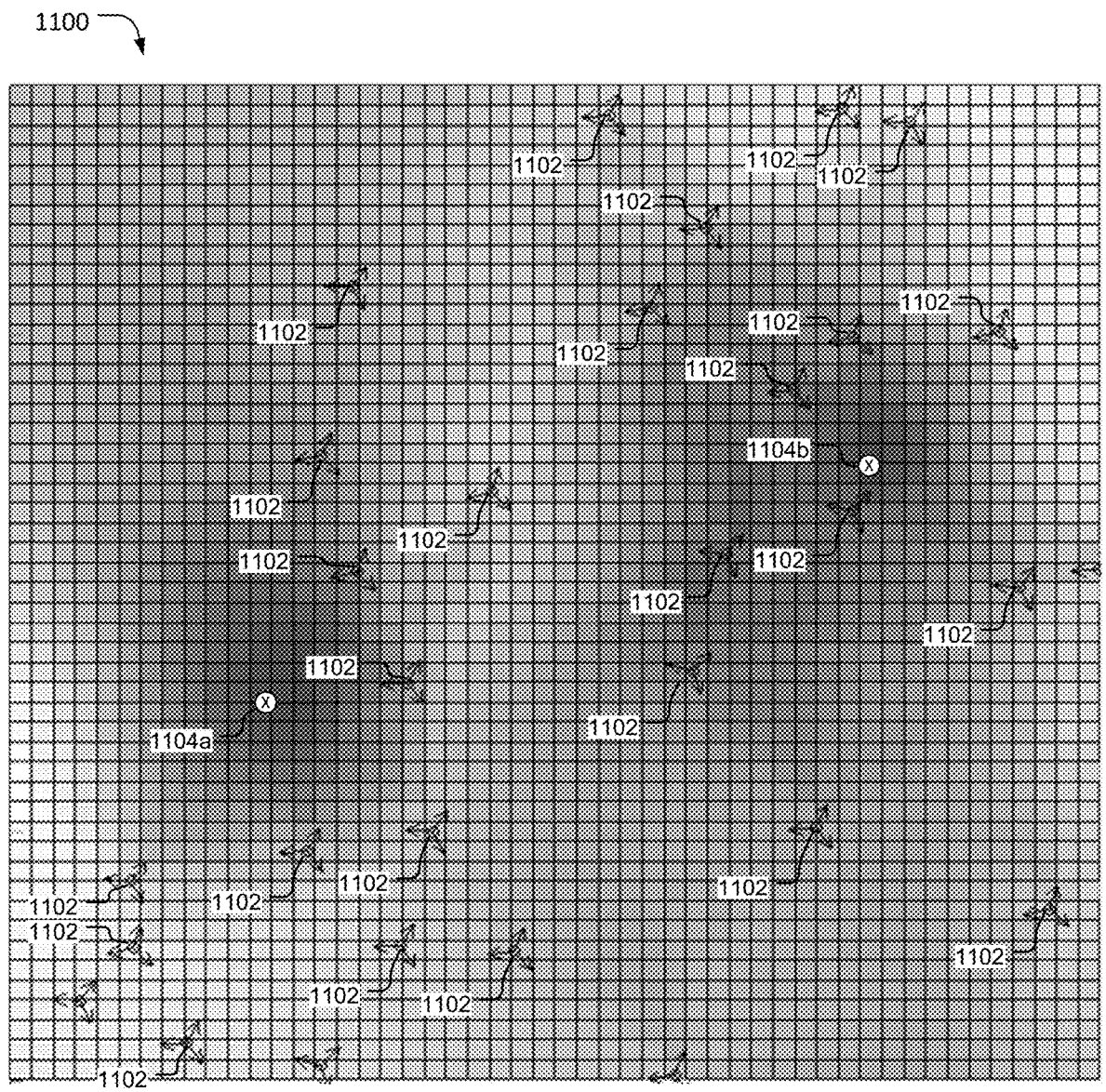
FIG. 11 illustrates an embodiment of a heat map showing a distribution of probability values in a grid of pixels.

In an embodiment, a probability heat map is generated at S310. FIG. 11 shows an embodiment of a heat map 1100 that is generated by an embodiment of the present disclosure. In the heat map 1100 in FIG. 11, the pixels of the grid are shaded according to a probability of a source of external interference 1004 being present at each pixel location. The shading of the heat map is scaled so that darker areas represent a higher probability of the interference source being present, and lighter areas indicate lower probability values.

Two external interference sources are present in FIG. 11, labeled as 1004a and 1004b. The locations of the interference sources 1004 are marked with an "X." FIG. 11 illustrates two distinct interference sources as indicated by the two distinct associated dark colored pixel clusters. Heat map 1100 in FIG. 11 was generated using simulated measurement data for a plurality of cell sites 1102.

Figure 12:
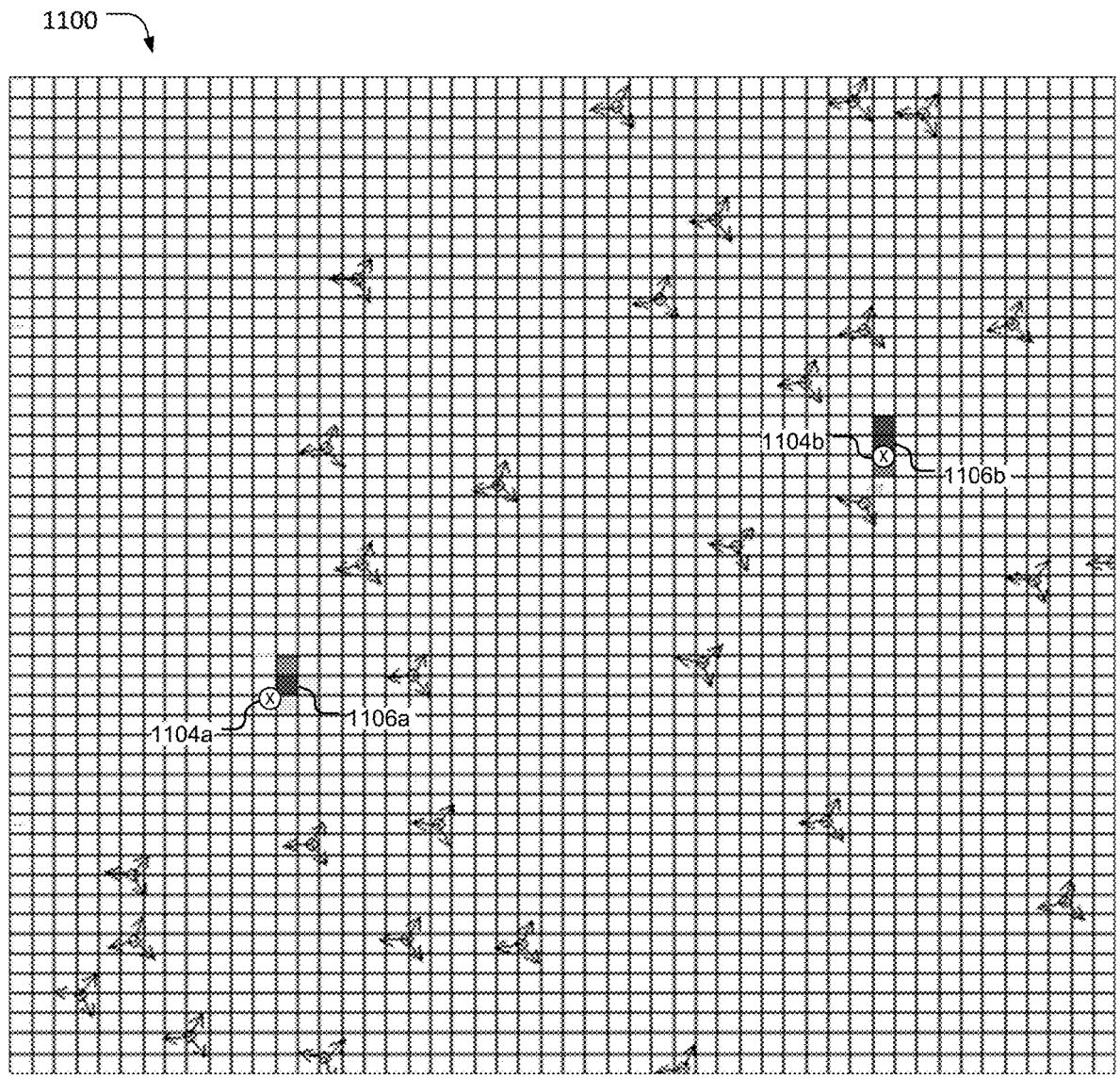
FIG. 12 illustrates an embodiment of a heat map created using the same data as FIG. 11 that is scaled to show local maxima and a relatively minor variance of probability values for surrounding pixels.

In FIG. 11, probability values were scaled according to a logarithmic scale to show a relatively broad probability distribution. In contrast, FIG. 12 shows a heat map 1100 that is scaled to show local maxima 1106 and a relatively minor variance of probability values for surrounding pixels. FIG. 12 was created using the same data as FIG. 11, except that probability values used to shade pixels are not log values. Pixels 1106a and 1106b with the highest probability values are very near to interference locations 1104a and 1104b, respectively, and maximum pixel value 1106b is geographically coincident with interference source 1106b. Accordingly, the locations in FIG. 12 are highly accurate.

Figure 13:
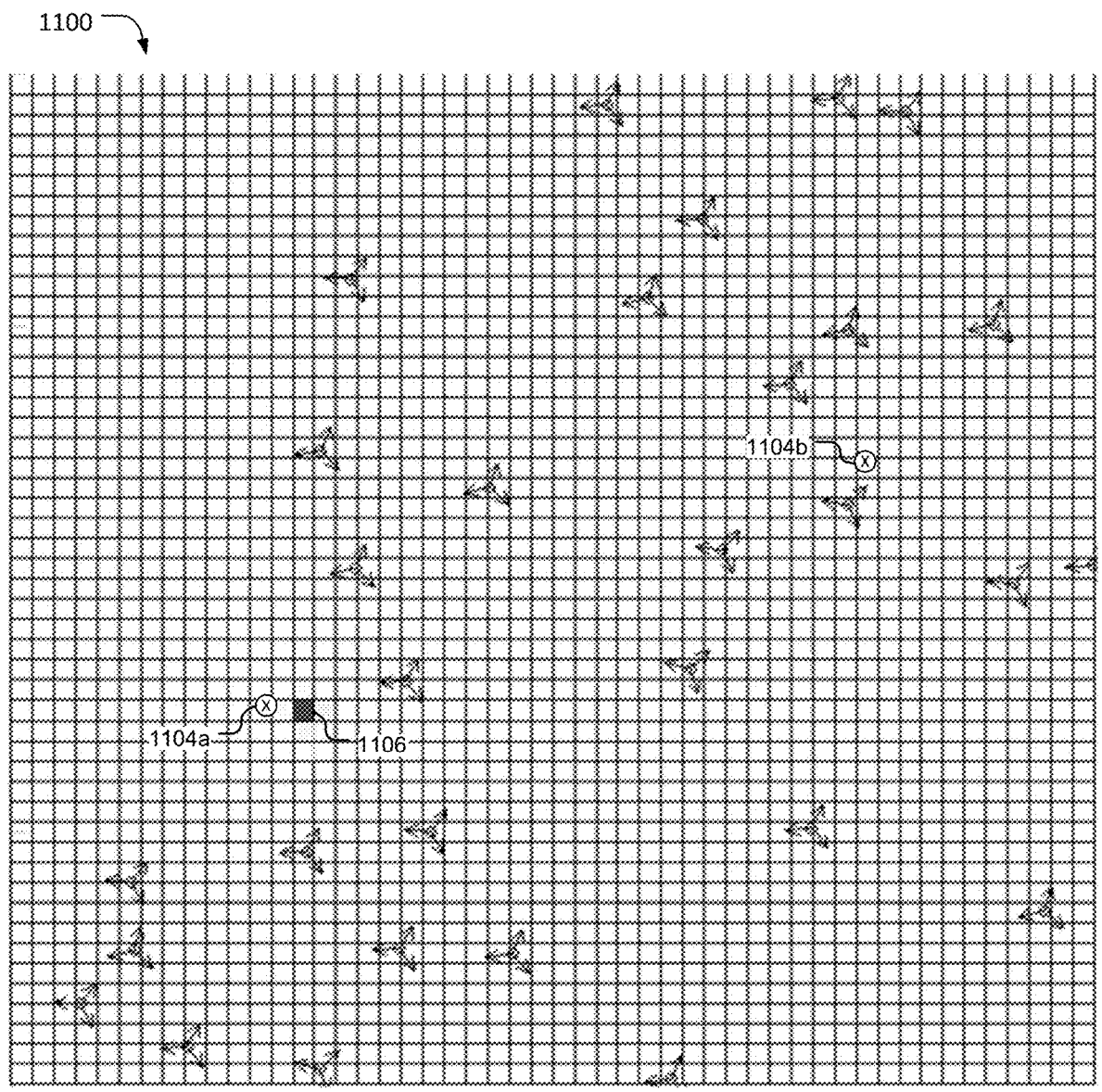
FIG. 13 illustrates a heat map resulting from a trilateration process.

FIG. 13 represents a result of performing a conventional trilateration process to determine a location 1006 of the interference source 1004a. The conventional process was able to identify a location 1006 that corresponds to one source of external interference with a reasonable degree of accuracy, but was unable to identify the second source 1004b. The ability to resolve and identify multiple sources of interference in a single geographic area is a substantial advantage of embodiments of the present disclosure compared to conventional technologies, which typically yield a single point in space as an interference location.

The heat map of FIG. 13 was generated using the same data as FIG. 11 and FIG. 12. The conventional process resulted in identifying an interference location 1106 two pixels away from the location of interference source 1104a. In contrast, the Experimental example of FIG. 12 according to an embodiment of a Bayesian process according to the present disclosure indicates a maximum probability of interference source 1104a being less than one pixel away at pixel 1106a. The higher accuracy apparent by comparing FIG. 12 to FIG. 13 is another advantage of embodiments of the present disclosure compared to conventional interference location techniques.

A location for a source of interference is determined at S312. FIG. 12 represents an example of identifying a source of interference, where the pixels representing probability maxima 1106 may be provided as locations with the highest probability of interference being present. In another embodiment, a heat map with a broader distribution of probabilities as represented by FIG. 11 may be provided to identify interference source locations. Persons of skill in the art will recognize that variations in a radio environment may affect measurement accuracy, so a limited distribution of probability values as represented in FIG. 12 may not accurately identify a source of interference. Accordingly, embodiments may use various scales of a probability heat map to identify one or more external source of interference.

In an embodiment, identifying an external source of interference at S312 may involve providing a heat map of probability values to technicians that deploy in the field with RF signal detection equipment to pinpoint the specific physical location and cause of interference. In other embodiments, network personnel may use a heat map or other form of probability distribution data in conjunction with geographic information to identify a source of interference without deploying personnel in a drive test. For example, probability maxima may coincide with a location of an entity that is known to cause interference, such as a television transmitter or radar. An embodiment may automate interference source identification by correlating high probability values and known locations for potential sources of interference.

Process 300 may further characterize the interference with, for example, time and frequency information, that can help a network operator rapidly and efficiently identify its source. For example, time, amplitude and frequency characteristics can be used to determine that interference is from a predetermined source, such as a sparking electrical coupling or a radar installation.

The external interference may be resolved at S314. In an embodiment, resolving the source of external interference may include interfacing with the source of interference to ensure that it no longer transmits in frequencies licensed to a wireless operator. In another embodiment, resolving interference at S314 may include adapting parameters of a wireless communications system to avoid or minimize the impact of a source of external interference.

Embodiments of the present disclosure represent numerous improvements to interference detection technology. As seen with respect to FIGS. 11-13, embodiments can identify multiple discrete sources of interference within a predetermined geographical area. In addition, testing performed by the inventors has established that embodiments of the present disclosure are more accurate than conventional techniques used in the wireless industry. One reason for improved accuracy is that embodiments can use measurement data from a cell site for which only one antenna measures interference levels above the noise floor. In addition, embodiments can provide a range of probability values across a geographic area.

Conventional approaches suffer from many shortcomings. Trilateration and triangulation have much lower accuracy, and generally yield a single point in space. Conventional approaches cannot typically identify locations of multiple sources of interference. When multiple sources of interference are present, location results of conventional localization techniques used in the wireless industry are incapable of identifying two separate sources, and the accuracy of identifying the location of a single interference source may be substantially compromised.

An operator can use information from embodiments of this disclosure to deploy personnel to remedy the physical cause of interference, such as shutting down a rogue transmitter or repairing a sparking transformer. An operator may be a licensor of RF spectrum that operates a cellular telecommunications network. Furthermore, embodiments of the present disclosure can analyze and characterize interference without requiring network service interruptions, and without installing additional energy sensing equipment in network areas.

Embodiments relate to a method that detects and localizes external interference source using network management data without having to measure and collect additional interference data using separate measurement devices. Based on network management data, such as CM (Configuration Management), PM (Performance Management) and Topology data, an embodiment creates hypothetical data for external interference and generates a probability heatmap of possible locations of external interference around the affected area. Embodiments may be implemented without details of transmitted interference signals, and diminish the impact of fading and shadowing in a radio environment, so that a location of external interference can be identified with a high degree of accuracy.

What is claimed is:

1. A method for locating a source of interference external to a wireless telecommunications network, the method comprising:
receiving signal strength measurement data for measurements taken by a plurality of cellular antennas of multi-sector cell sites;
determining that an external interference signal is present in the measurement data;
establishing a grid of pixels that represents an area associated with the plurality of cellular antennas;
determining respective first signal strength values for the pixels in the grid; and
determining respective probability values for the pixels in the grid by comparing the signal strength measurement data to the first signal strength values.

2. The method of claim 1, wherein determining the first signal strength values comprises:
determining an angle of arrival for a pair of antennas of a cell site for each of the pixels; and
determining an expected interference power for each of the pixels using the associated angles of arrival.

3. The method of claim 1, wherein determining the respective probability values comprises:
determining differences between values of the signal strength measurement data for antennas in an antenna pair and a hypothetical interference value for each pixel; and
assigning respective probability values to each pixel based on the differences.

4. The method of claim 3, wherein, when a measured value of a first antenna of the antenna pair is equal to the noise floor and a measured value of a second antenna of the antenna pair is above the noise floor, the first signal strength value of the second antenna is set based on a difference between the measured value of the second antenna and the noise floor.

5. The method of claim 3, wherein assigning the probability values comprises:
segmenting a normal distribution into a set of binned values; and
assigning one the binned values as the probability value for each pixel for a respective antenna pair.

6. The method of claim 5, wherein assigning the probability values further comprises:

combining the binned values of antenna pairs of each cell site; and combining probability values of each cell site, wherein the respective probability values for the pixels are the combined probability values of each cell site.

7. The method of claim 1, wherein the grid comprises a plurality of shapes that represent the pixels, and the grid is associated with a geographic area that includes all of the multi-sector cell sites.

8. The method of claim 1, wherein determining the respective probability values comprises:

determining at least two local probability maxima within the grid, each of the local probability maxima being associated with a respective source of the external interference.

9. The method of claim 1, further comprising:

providing a heat map indicating probability values of at least a portion of the pixels in the grid.

10. The method of claim 1, wherein comparing the signal strength measurement data to the first signal strength values includes determining differences between the signal strength measurement data and the first signal strength values to determine the respective probability values.

11. A wireless telecommunications system comprising a spectrum analysis server configured to locate a source of interference external to a wireless telecommunications network, the spectrum analysis server comprising a processor and a non-transitory computer readable medium with instructions stored thereon which, when executed by the processor, perform the following steps:

receiving signal strength measurement data for measurements taken by a plurality of cellular antennas of multi-sector cell sites;

determining that an external interference signal is present in the measurement data;

establishing a grid of pixels that represents an area associated with the plurality of cellular antennas;

determining respective first signal strength values for the pixels in the grid; and determining respective probability values for the pixels in the grid by comparing the signal strength measurement data to the first signal strength values.

12. The system of claim 11, wherein determining the first signal strength values comprises:

determining an angle of arrival for a pair of antennas of a cell site for each of the pixels; and determining an expected interference power for each of the pixels using the associated angles of arrival.

13. The system of claim 11, wherein determining the respective probability values comprises:

determining differences between values of the signal strength measurement data for antennas in an antenna pair and a hypothetical interference value for each pixel; and assigning respective probability values to each pixel based on the differences.

14. The system of claim 13, wherein when a measured value of a first antenna of the antenna pair is equal to the noise floor and a measured value of a second antenna of the antenna pair is above the noise floor, the first signal strength value of the second antenna is set based on a difference between the measured value of the second antenna and the noise floor.

15. The system of claim 13, wherein assigning the probability values comprises:

segmenting a normal distribution into a set of binned values; and assigning one the binned values as the probability value for each pixel for a respective antenna pair.

16. The system of claim 15, wherein assigning the probability values further comprises:

combining the binned values of antenna pairs of each cell site; and combining probability values of each cell site, wherein the respective probability values for the pixels are the combined probability values of each cell site.

17. The system of claim 11, wherein the grid comprises a plurality of shapes that represent the pixels, and the grid is associated with a geographic area that includes all of the multi-sector cell sites.

18. The system of claim 11, wherein determining the respective probability values comprises:

determining at least two local probability maxima within the grid, each of the local probability maxima being associated with a respective source of the external interference.

19. The system of claim 11, wherein the computer readable medium further comprises instructions for providing a heat map indicating probability values of at least a portion of the pixels in the grid.

20. The system of claim 11, wherein comparing the signal strength measurement data to the first signal strength values includes determining differences between the signal strength measurement data and the first signal strength values to determine the respective probability values.

\* \* \* \* \*